United States Patent
Stojanovski et al.

(10) Patent No.: US 10,897,773 B2
(45) Date of Patent: Jan. 19, 2021

(54) BEARER-LESS ARCHITECTURE FOR A WIRELESS CELLULAR NETWORK

(71) Applicant: Apple Inc., Cupertino, CA (US)

(72) Inventors: Alexandre Stojanovski, Paris (FR); Muthaiah Venkatachalam, Beaverton, OR (US); Richard Burbidge, Shrivenham (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/765,998

(22) PCT Filed: May 17, 2016

(86) PCT No.: PCT/US2016/032896
§ 371 (c)(1),
(2) Date: Apr. 4, 2018

(87) PCT Pub. No.: WO2017/062066
PCT Pub. Date: Apr. 13, 2017

(65) Prior Publication Data
US 2018/0288784 A1    Oct. 4, 2018

Related U.S. Application Data

(60) Provisional application No. 62/238,072, filed on Oct. 6, 2015.

(51) Int. Cl.
*H04W 72/12* (2009.01)
*H04W 28/02* (2009.01)
*H04W 76/12* (2018.01)
*H04W 76/10* (2018.01)

(52) U.S. Cl.
CPC ... *H04W 72/1236* (2013.01); *H04W 28/0252* (2013.01); *H04W 76/10* (2018.02); *H04W 76/12* (2018.02)

(58) Field of Classification Search
None
See application file for complete search history.

(56) References Cited

U.S. PATENT DOCUMENTS

| 2010/0067400 | A1 | 3/2010 | Dolganow et al. |
| 2012/0120828 | A1* | 5/2012 | Anderson ......... H04W 52/0225 370/252 |
| 2015/0009826 | A1* | 1/2015 | Ma .................... H04W 28/0268 370/235 |

OTHER PUBLICATIONS

International Search Report and Written Opinion of corresponding PCT Application PCT/US2016/032896 dated Jul. 20, 2016.
(Continued)

*Primary Examiner* — Peter Chen
*Assistant Examiner* — Jeff Banthrongsack
(74) *Attorney, Agent, or Firm* — Eschweiler & Potashnik, LLC

(57) ABSTRACT

An architecture, for a cellular communications system, is described herein in which a "bearer-less" model is used for both the radio interface and the network core. Instead of using an individual Layer 2 bearer for each Quality of Service (QoS) class, in the architecture described herein, a common Layer 2 connection (e.g., a Layer 2 "fat pipe") may be used to handle traffic flows between a User Equipment (UE) device and an external Packet Data Network (PDN). Additionally, a bearer-less architecture may be used in the radio interface (i.e., between User Equipment (UE) and the eNB).

18 Claims, 9 Drawing Sheets

(56) References Cited

OTHER PUBLICATIONS

3GPP TS 36.300 V11.13.0, "3rd Generation Partnership Project; Technical Specification Group Radio Access Network; Evolved Universal Terrestrial Radio Access Network (E-UTRAN); Stage 2 (Release 11)", Mar. 2015.

* cited by examiner

BEARER-LESS ARCHITECTURE FOR A WIRELESS CELLULAR NETWORK

RELATED APPLICATIONS

The present application claims the benefit of U.S. Provisional Patent Application No. 62/238,072, which was filed on Oct. 6, 2015, the contents of which are hereby incorporated by reference as though fully set forth herein.

BACKGROUND

LTE (Long-Term Evolution) is a standard for wireless communication of high-speed data for mobile phones and data terminals (mobile devices). An LTE cellular communication system may include a Radio Access Network (RAN) section and a "core" network section. The RAN section handles the wireless (radio) communications with the mobile devices. The "core" portion may handle control, handover, and routing functionality relating to providing data services to the mobile devices. The core portion may include gateway devices that connect users of the cellular communication system to external networks (e.g., the Internet).

Existing mobile networks, such as the Third Generation Partnership Project (3GPP) Evolved Packet Core (EPC), as defined in 3GPP Release 8, may separate control plane and data plane traffic in the core network. Separation of the control and data plane traffic provides a number of desirable properties, such as the ability to separately scale the control plane and data plane devices. However, even with the separation of the control and data plane, the ability to scale the capacity of the network is limited and may not meet the expected capability needs in some of the key system capabilities.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
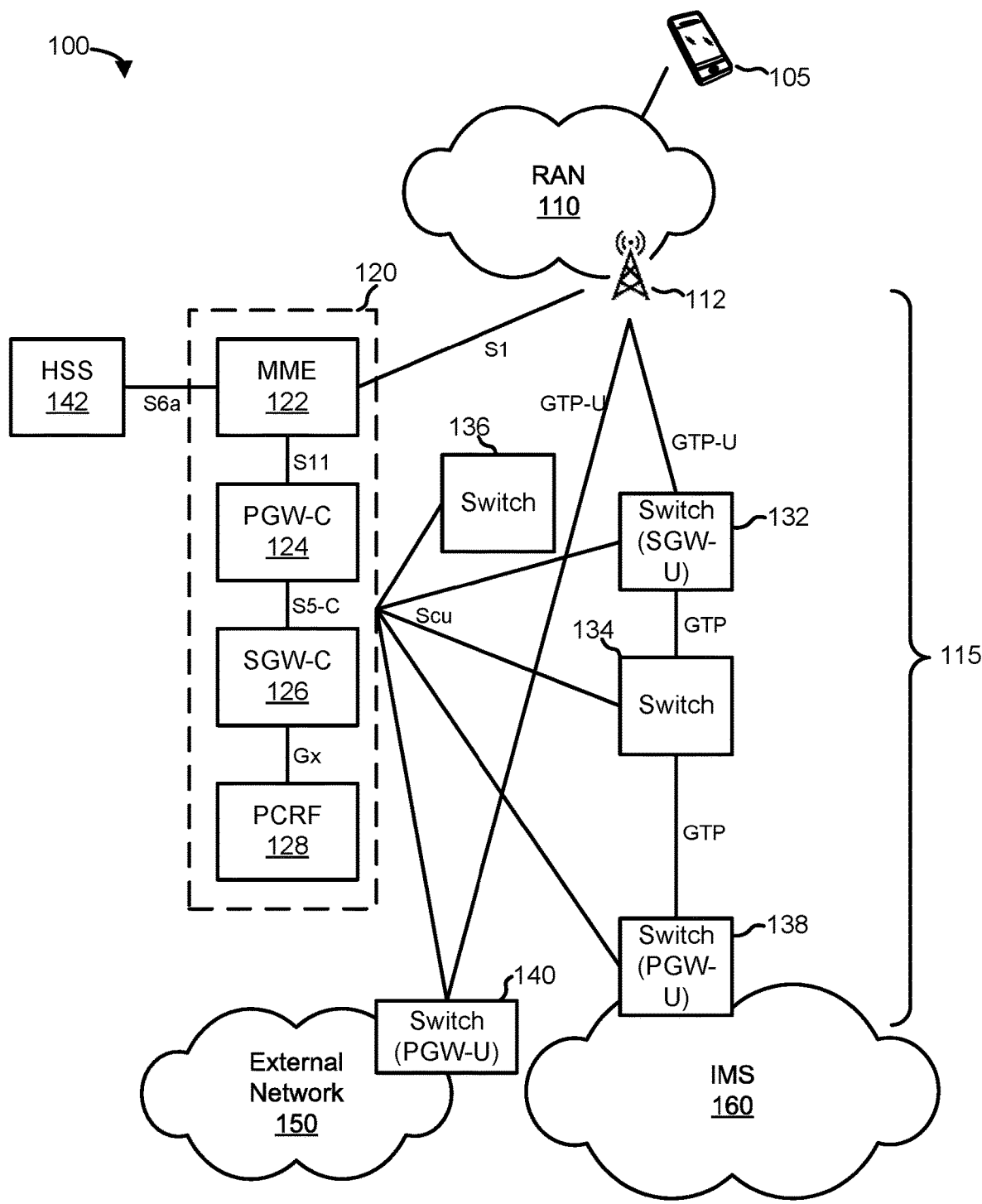
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

An ongoing trend in networking technology today is the emergence of Software Defined Networks (SDN) and Network Function Virtualisation (NFV). These two techniques allow for separation of the Control plane (C-plane) from the User plane (U-plane) in network nodes, and subsequent "cloudification" of the Control plane functions. One of the drivers behind this trend is the fact that the C-plane and U-plane do not scale in the same way. Additionally, other factors, such as the willingness to use generic hardware platforms or the ability to orchestrate "network as a service" implementations, may provide additional reasons to use a SDN/NFV-based architecture.

An architecture, for a cellular communications system, is described herein in which a "bearer-less" model is used for both the radio interface and the network core. Instead of using an individual Layer 2 bearer for each Quality of Service (QoS) class, in the architecture described herein, a single common Layer 2 connection (a common or shared Layer 2 pipe or "fat pipe") may be used to handle all of the traffic flows between a evolved NodeB (eNB) and an external Packet Data Network (PDN). Additionally, a bearer-less architecture may be used in the radio interface (i.e., between User Equipment (UE) and the eNB).

The term "bearer," as used herein, refers to a Layer 2 (i.e., data link layer) communication in the Open Systems Interconnection model (OSI model) conceptual model. Bearer connections may be concerned with the local delivery of data-link frames (or other data units) between network devices. Bearer connections typically do not cross the boundaries of a local network. In contrast, Layer 3 functions, such as Internet Protocol (IP) based functions, may perform inter-network routing and global addressing. Relative to bearer connections, the Layer 3 functions are higher layer functions used to relay datagrams across network boundaries. The term "bearer-less," as used herein, refer to a communication architecture that uses a reduced number of bearers (and not necessarily a system with no bearers) relative to existing architectures.

The use of a bearer-less model may advantageously reduce the number of tunnels in the system, which may be beneficial for scalability. Additionally, in the current bearer model for the network core, common convergence points, such as the Serving Gateway (SGW), may be required to terminate a bearer link. In the bearer-less model described herein, however, traffic flows can directly fork from the base station (e.g., the Evolved Node B (eNB)), and thus do not require a common convergence point. Additionally, in a bearer-based model, the number of user plane switching points may be required to be fixed. In the bearer-less architecture described herein, however, the control plane may dynamically control routing functions in the user plane among an arbitrary number of switching nodes. Each of the switching nodes may perform functions typically performed by the SGW and/or the PDN Gateway (PGW) in Release 8 of the 3GPP standards. User plane routing of traffic flows may thus be controlled by 3GPP-specific logic.

FIG. 1 is a diagram of an example environment 100 in which systems and/or methods described herein may be implemented. Environment 100 may generally provide a SDN and/or NFV-based architecture that separates control plane signaling messages and user plane data traffic. Environment 100 may include a wireless cellular network based on the 3GPP standards.

As illustrated, environment 100 may include User Equipment (UE) 105, which may obtain network connectivity from a wireless cellular network. The wireless cellular network may include a Radio Access Network (RAN) 110 and an Evolved Packet Core (EPC) portion ("core" or "network core") 115. EPC 115 may include a control plane and a user plane. Control plane functions are illustrated in FIG. 1 as being performed by control plane block 120. Control plane block 120 may be implemented using a cloud-based model in which computing services can be added or removed on demand, potentially at a centralized location. User plane functions of EPC 115 are illustrated outside of control plane block 120 (e.g., as network nodes 132-142). The user plane functions may include the implementation of a high capacity backhaul network and may need to be implemented at geographically diverse locations (e.g., at the locations of base stations, gateways to external networks, etc.). EPC 115 may connect to external PDNs, such as an external network 150 (e.g., the Internet or other network) and IP Multimedia Subsystem (IMS) 160.

Additionally, as shown in FIG. 1, certain functions, such as existing 3GPP standard functions (e.g., as of Release 8), are illustrated as being performed by the control plane and the user plane. For example, the control plane functions of a PGW are represented by PGW-C and the user plane PGW functions are represented by PGW-U. Similarly, the control plane functions of a SGW are represented by SGW-C and the user plane SGW functions are represented by SGW-U.

UE 105 may include a portable computing and communication device, such as a personal digital assistant (PDA), a smart phone, a cellular phone, a laptop computer with connectivity to a cellular wireless network, a tablet computer, etc. UE 105 may also include non-portable computing devices, such as desktop computers, consumer or business appliances, or other devices that have the ability to wirelessly connect to network 110. For simplicity, a single UE 105 is shown. In practice, multiple UEs 105 may operate in the context of a wireless network.

RAN 110, as mentioned, may provide the radio interface for the wireless cellular network. RAN 110 may include a number of base stations, such as a base station, capable of implementing a wireless interface with UE 105. The base station may include, for example, antennas and associated antenna transceiver circuitry. Thus, the base station may provide radio resources for UE 105. In some implementations, the base station may be an eNB 112. eNB 112 may include a macrocell node, which may be a node capable of providing wireless network connectivity in a relatively large area. Alternatively or additionally, eNB 112 may include a small cell that may be deployed to increase system capacity by including a coverage area within a macro cell. Small cells may include, for example, picocells, femtocells, and/or home NodeBs. For simplicity, a single eNB is shown in FIG. 1. In practice, multiple eNBs 112 may operate in the context of a wireless network.

Control plane block 120 may include one or more computing devices that implement control plane functions for EPC 115. The control plane functions may include functions relating to control operations such as network attaches, security control, authentication, setting up of traffic flows, and mobility management. The control plane functions may correspond to the information flow and signaling between UE 105, RAN 110, and EPC 115. The control plane functions may include functions that are compute centric, and be limited by one or more computing devices, such as distributed computing devices, cloud-based computing devices, etc.

Control plane block 120 may particularly implement a number of functions that are identical to or similar to those implemented by network devices/functions that exist in the 3GPP standards. For example, control plane block 120 may implement functions of Mobility Management Entity (MME) 112; control plane functions of a PGW, shown as PGW-C 124; control plane functions of a SGW, shown as SGW-C 126; and Policy and Charging Rules Function (PCRF) 128. SGW-C 126 and PGW-C 124 functions may generally handle the General Packet Radio Service (GPRS) Tunneling Protocol (GTP)-C protocol. That is, PGW-C 124 and SGW-C may, for example, perform signaling relating to the establishment of GTP tunnels between nodes in the user plane.

MME 122 may act as a control point for eNB 112 and/or other devices that provide the air interface for the wireless telecommunications network. For example, MME 122 may perform operations to register UE 105 with the wireless telecommunications network, to establish traffic flows associated with a session with UE 105, to hand off UE 105 to a different eNB or another network, and/or to perform other operations. PCRF 128 may receive information regarding policies and/or subscriptions from one or more sources, such as subscriber databases and/or from one or more users. PCRF 128 may provide these policies to PGW-U devices, or other devices, so that the policies can be enforced.

In control plane block 120, a number of 3GPP-defined interfaces are illustrated, such as the S11 interface between MME 122 and PGW-C, the S5-C interface between PGW-C 124 and SGW-C 126, and the Gx interface between SGW-C 126 and PCRF 128. In some implementations, because control plane block 120 may be implemented as a cloud implementation, one or more of these interfaces may be internalized within the cloud implementation.

As shown, the user plane of FIG. 1 may be implemented via a number of nodes, labeled as switches 132-140. Although described as switches herein, switches 132-140 may be implemented using general computing devices, purpose built switches or routers, or other network devices. By applying SDN/NFV techniques to switches 132-140, the role of each of these nodes may be flexibly modified as needed. For example, the user plane may be easily scaled and as illustrated, switch 132 may operate as a SGW-U device while switches 138 and 140 may operate as PGW-U devices. Switches 134 and 136 may operate as standard switches/routers that are used to forward the user plane traffic via GTP. Cross-connections of layer 2 tunnels in switches 132-134 may be configured by control plane block 120. The configuration of the cross-connections may be performed via an interface defined for this purpose, and is illustrated in FIG. 1 as the "Scu" interface.

Switches 132-140 that operate as SGW-U nodes may operate to receive traffic from one or more eNBs 112 and may forward the traffic to a next node in EPC 115. Additionally, the SGW-U device may receive traffic from one or more PGW-U devices (or intermediate switches) and forward the traffic to one or more eNBs 112. Switches 132-140 that operate as PGW-U may operate as an interface between EPC 115 and external PDNs (e.g., external network 150 and/or IMS 160). Both the PGW-U and SGW-U devices may potentially operate to buffer traffic destined for UE 105 when the UE is operating in Idle mode. In some implementations, some of switches 132-140 may simultaneously function to perform both the SGW-U and the PGW-U functions.

In some implementations described herein, UE 105 may be associated with multiple SGW-U nodes. For instance, certain traffic flows may be routed to one SGW-U node and other traffic flows to another SGW-U node (i.e., when UE is moved to Idle mode there will be two distinct SGWs for the same UE; one per-PDN connection).

The routing may be controlled by control plane block 120, which may dynamically establish and/or modify the GTP-U tunnels as needed to optimize network traffic in EPC 115. For example, control plane block 120 may establish a tunnel between eNB 112 and the PGW-U 138 that goes through more than one intermediate user plane nodes. In this example, the first user plane node (relative to the eNB) may include the ability to buffer data for UEs in Idle mode, and the last user plane node may be required to serve as ingress point to a PDN. The other intermediate nodes may act as Layer 2 switches.

GTP tunnels are illustrated in FIG. 1. GTP is a tunneling protocol used to encapsulate user data passing through core network 115. As mentioned previously, GTP-C may refer to the control portion of GTP. GTP-U refer to the user plane tunnel that is used to carry the user data traffic.

Additionally, as shown, environment 100 may include Home Subscriber Server (HSS) 142. HSS 142 may include one or more devices that may manage, update, and/or store, in a memory associated with HSS 142, profile information associated with a subscriber (e.g., a subscriber associated with UE 105). The profile information may identify applications and/or services that are permitted for and/or accessible by the subscriber; a Mobile Directory Number (MDN) associated with the subscriber; bandwidth or data rate thresholds associated with the applications and/or services; and/or other information. HSS 142 may be implemented as park of control plane block 120 or as part of the user plane.

Figure 2:
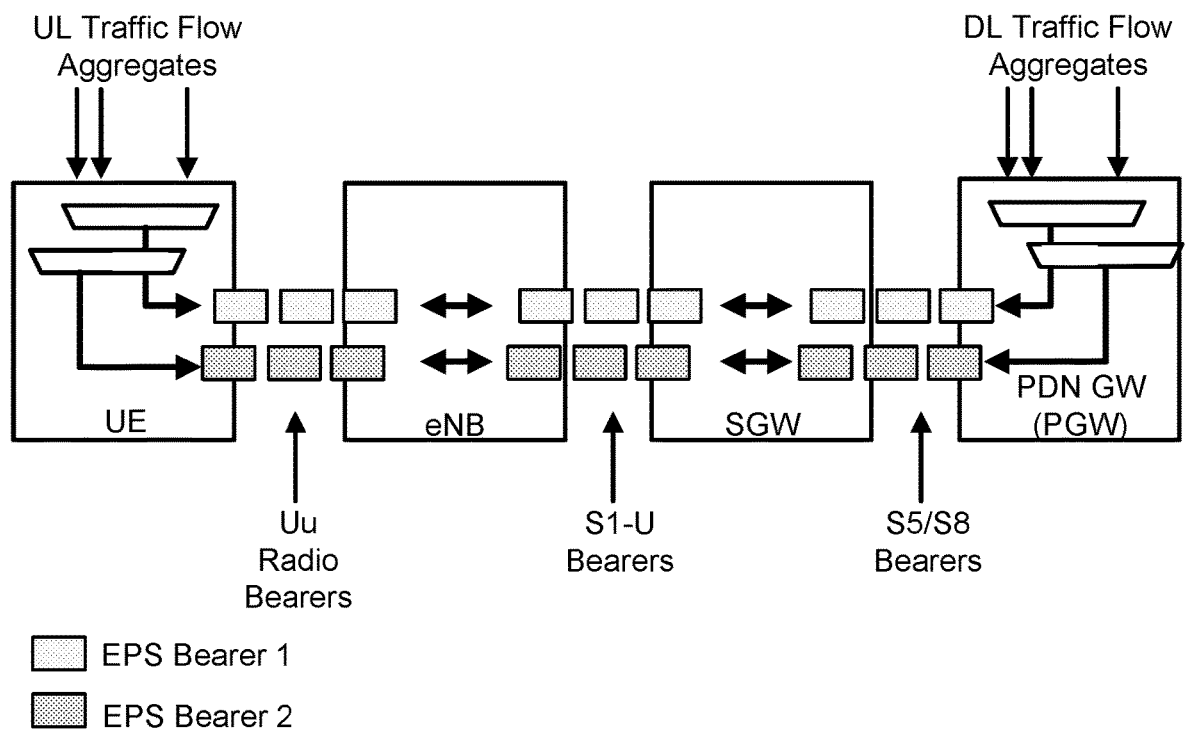
FIG. 2 is a diagram illustrating an example of the use of Evolved Packet System (EPS) bearers that are implemented by network elements in an existing 3GPP architecture.

FIG. 2 is a diagram illustrating an example of the use of EPS (Evolved Packet System) bearers that are implemented by network elements in an existing 3GPP architecture. As previously mentioned, a LTE bearer refers to a Layer 2 construct that defines a point-to-point link between UE 105 and the PGW.

As shown in FIG. 2, a 3GPP EPS bearer path may include three segments: the radio bearer (Uu) portion (between the UE and the eNB), the S1-U bearer portion (between the eNB and the SGW), and the S5/S8 bearer portion (between the SGW and the PGW). Each EPS bearer may be associated with a specific IP address and a specific QoS class. The QoS class can be expressed in the form of a QoS Class Indicator (QCI) value that is associated with the EPS bearer. Two EPS bearers are illustrated in FIG. 2, labeled as "EPS bearer 1" and "EPS bearer 2".

As an example of the EPS bearer concept, consider the situation in which the UE is engaged in two PDN connections (e.g., "PDN1" and "PDN2"), which means that the UE uses two different IP addresses and prefixes. Also assume that PDN1 needs to discriminate between four QoS classes (e.g., IMS signaling, IMS voice media, higher priority data, and best effort data) and PDN2 needs to discriminate between two QoS classes (e.g., high priority data and best effort data). The total number of EPS bearers used by the UE in the above example is six, despite the fact that the two PDN connections have two QoS classes in common (i.e. high priority data, best effort data). Thus, in this example, the same number of EPS bearers is needed not only on the radio interface (i.e. six "radio bearers"), but also inside the network (i.e. six "S1-U bearers" and six "S5/S8 bearers"). The endpoints of the EPS bearer (i.e. UE and PGW) perform a "bearer binding" operation in the uplink and downlink, respectively, which means that the endpoints determine the association of an IP packet with the underlying EPS bearer on a packet-by-packet basis. In the process of bearer binding the EPS bearer endpoints (UE and PGW) may also select the QCI that determines the QoS handling of the packet on its journey between the two EPS bearer endpoints.

Consistent with aspects described herein, the fine-grained QoS handling used by multiple EPS bearers may be replaced with a common Layer 2 connection that includes multiple traffic flows. In one implementation, the QoS handling of the radio segment may be separated from the backhaul handling (used inside the network core), and the EPS bearer backhauling function (e.g., the S1-U and S5/S8 segment illustrated in FIG. 2) may be replaced with common Layer 2 connections.

Figure 3:
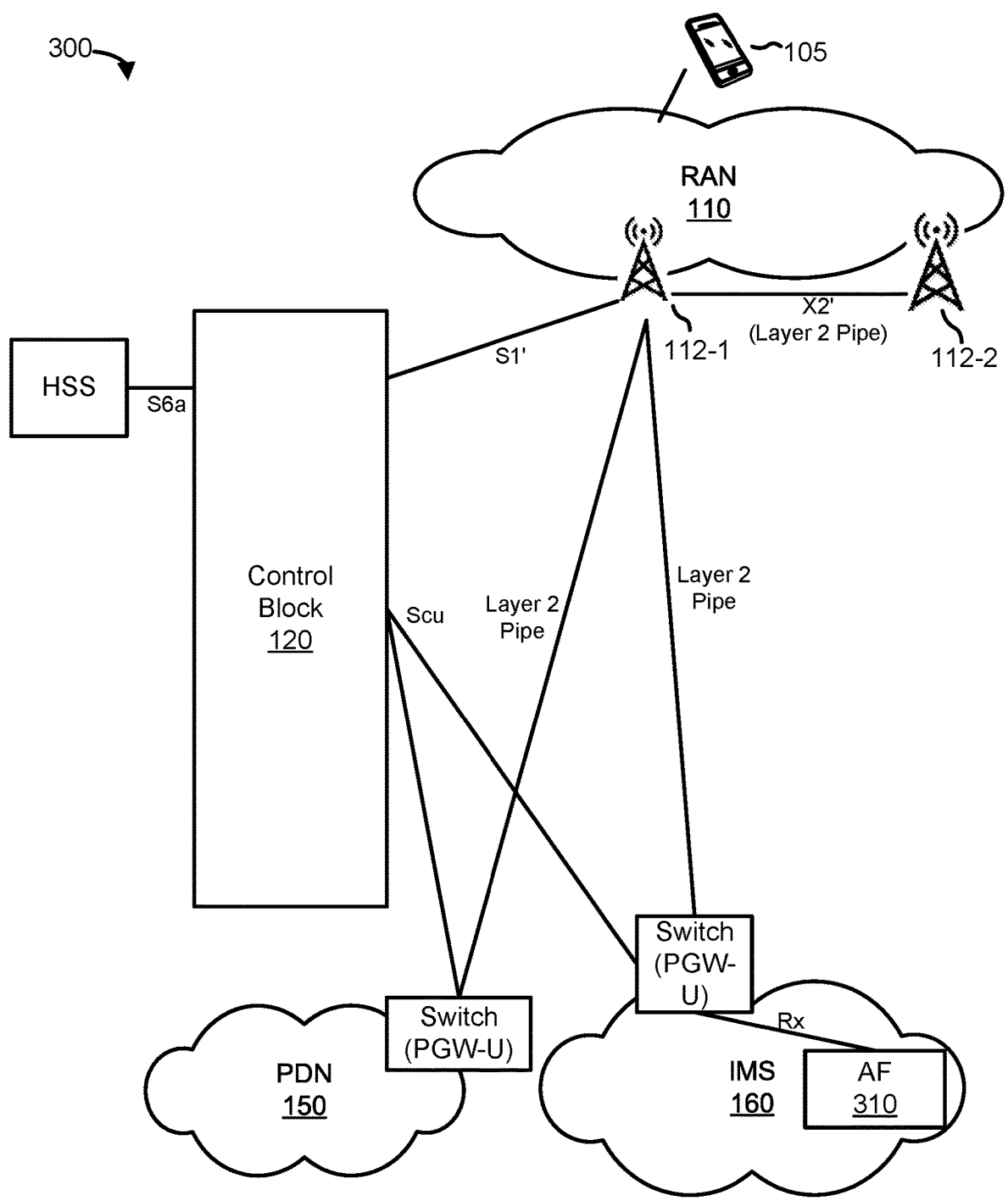
FIG. 3 is a diagram conceptually illustrating an environment in which systems and/or methods described herein may be implemented.

FIG. 3 is a diagram conceptually illustrating an environment 300 in which systems and/or methods described herein may be implemented. FIG. 3 may be similar to FIG. 1. FIG. 3, however, is shown in a conceptually simplified manner. Additionally, in FIG. 3, multiple eNBs, labeled as eNB 112-1 and eNB 112-2, are illustrated. Communications between control block 120 and eNBs 112 may be made using the 3GPP S1 interface or using a modified version of the S1 interface (shown as interface S1'), such as a version of the S1 interface that is optimized for a cloud-based implementation of control block 120.

As shown in FIG. 3, the bearer-based S1-U and S5/S8 backhauling function, as shown in FIG. 2, is replaced by a common Layer 2 pipe. Each common Layer 2 pipe may be implemented as, for example, a single GTP-U connection between the serving eNB and a PGW.

Alternatively, other appropriate tunneling protocols, such as Generic Routing Encapsulation (GRE), may be used. When UE 112 is engaged in multiple PDN connections that terminate the geographically distinct PGWs, a different common Layer 2 pipe may terminate at each of the PGWs (i.e., multiple common Layer 2 pipes may fork from the eNB).

In the existing 3GPP architecture, the X2 interface may be used to connect two eNBs using per-EPS bearer tunnels when forwarding user data from one eNB to another upon handover. Consistent with aspects described herein, two eNBs, such as pairs of neighboring eNBs 112-1 and 112-2, may use a single common Layer 2 pipe to exchange user plane traffic (i.e., to exchange UE traffic). The common Layer 2 pipe between eNBs is illustrated as interface X2' in FIG. 3. The target (i.e., receiving eNB) may discriminate between traffic of different UEs, in the single common Layer 2 pipe, based on the IP address (e.g., the IP prefix) in headers of the packets transmitted over the common Layer 2 pipe.

The above description of a bearer-less architecture generally described the use of a bearer-less architecture for the backhaul function in the core network. Consistent with aspects described herein, the radio interface (i.e., the interface between the UE and the eNB) may also be modified to reduce the number of radio bearers.

Application Function (AF) 310 is also shown in FIG. 3. AF 310 may include or more application servers or processes that are used to implement the services provided by IMS 160.

Figure 4:
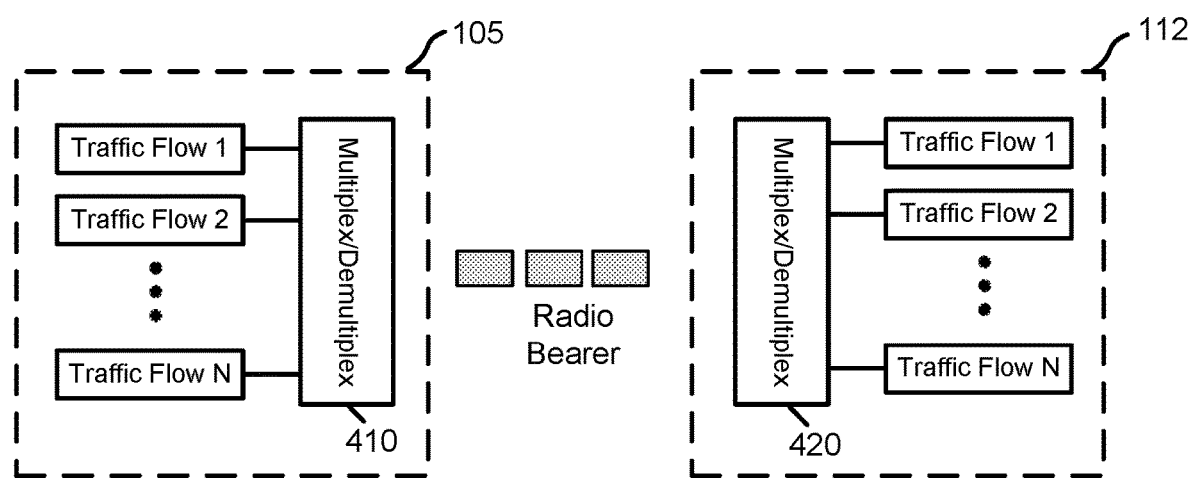
FIG. 4 is a diagram conceptually illustrating a radio interface between User Equipment (UE) and an evolved NodeB (eNB)

FIG. 4 is a diagram conceptually illustrating a radio interface between an UE and an eNB. As illustrated, UE 105 and eNB 112 may each include a multiplexer/demultiplexer component through which UE 105 and eNB 112 operate to combine (i.e., multiplex/demultiplex) multiple traffic flows, labeled as traffic flow 1 through traffic flow N, over a single radio bearer. Multiplexer/demultiplexer 410 may be associated with UE 105 and multiplexer/demultiplexer 420 may be associated with eNB 112. Each multiplexer/demultiplexer 410/420 may operate to combine multiple traffic flows over a single radio bearer. In other words, UE 105 and eNB 112 may operate to combine multiple traffic flows on the same radio bearer. Although a single radio bearer is shown in FIG. 4, in some implementations, UE 105 and eNB 112 may use multiple radio bearers, where at least some of the radio bearers are used to transport multiple traffic flows.

A "traffic flow," as this term is used herein, may refer to a particular sequence of packets sent from a particular source to one or more destinations. A traffic flow may be a Layer 3 construct. Each traffic flow may be independently assigned different QoS parameters. Thus, when multiple traffic flows are combined on a single radio bearer, the different packets being transported by the radio bearer may have different QoS parameters. Scheduling of the packets, from the different traffic flows, in a manner that satisfies the different QoS parameters, may be handled by the UE in the uplink direction and by the eNB in the downlink direction. The scheduling may be performed on a per-traffic flow basis. For example, the UE may schedule a higher proportion of the packets from a traffic flow having a higher priority (i.e., more stringent QoS parameters) than for the packets from a traffic flow having lower priority (e.g., less stringent QoS parameters).

In one implementation, QoS parameters for the traffic flows may be signaled, from control plane block 120, to eNB 112, on a per-packet flow (or per-service data flow (SDF)) basis (via the S1' interface). In one implementation, a "service data flow (SDF) template," such as a template defined in 3GPP TS 23.303 may be used to provide QoS parameters on a per-traffic flow basis. A SDF template may be used to identify a set of IP traffic flows corresponding to a particular SDF. Each of the traffic flows in a particular SDF may have common QoS the set, the associated QCI value, Guaranteed Bit Rate (GBR) value, Maximum Bit Rate (MBR) value, and/or Allocation and Retention Priority (ARP) value. Based on these QoS parameters the UE and/or eNB may schedule packets, from different traffic flows, within the same radio bearer in a manner that satisfies the QoS parameters. In particular, in one implementation, all GBR traffic and all non-GBR Unacknowledged Mode Radio Link Control (UM RLC) traffic may be multiplexed on the same radio bearer, potentially without adversely affecting the priority and/or GBR handling of the packets. In some implementations, however, traffic relying on the use of Acknowledged Mode RLC (AM RLC) may need to be carried on distinct radio bearers. In this situation, the eNB may locally determine when to establish a new radio bearer to support AM RLC.

In some implementations, traffic flows for different PDNs may also be included in the same radio bearer. For example, different traffic flows may be included in the same radio bearer and the eNB may discriminate the PDN connection to which the packets belong (i.e., the correct common Layer 2 pipe) based on the IP header of each packet (e.g., based on the IPv6 prefix).

The description above relates to a reduced bearer EPS architecture, not only in the packet core network, but also on the radio interface. One potential advantage of this architecture is the a dramatic reduction of in the number of bearers throughout the system, which may also lead to reduced amount of signaling for bearer establishment/release and a decreased number of bearer contexts stored in the network nodes.

Figure 5:
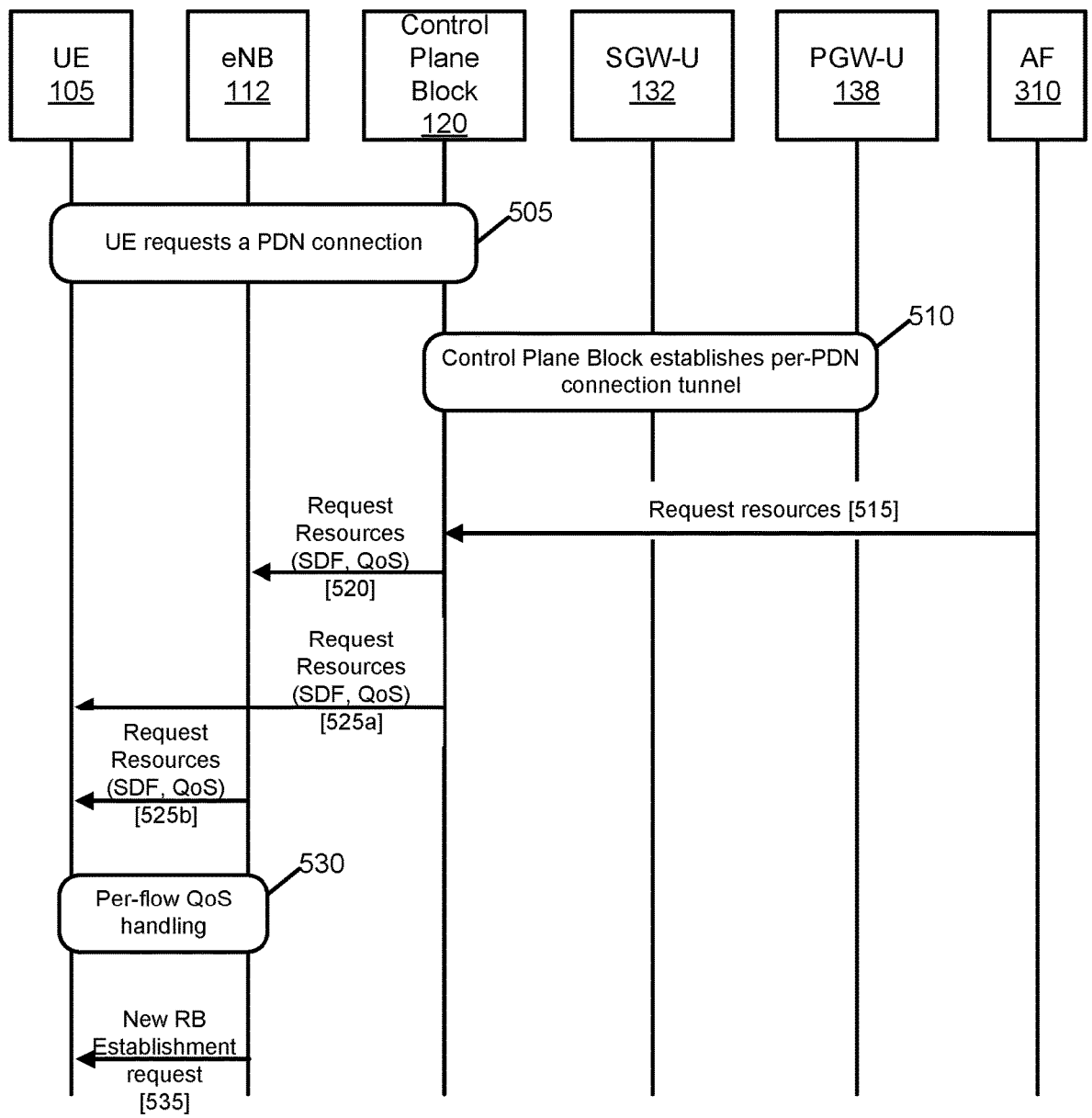
FIG. 5 is a signal flow diagram illustrating operations, relating to QoS and core network backhauling, in the bearer-less architecture described herein.

FIG. 5 is a signal flow diagram illustrating operations, relating to QoS and EPC backhauling, in the bearer-less architecture described herein. UE 105, eNB 112, control plane block 120, SGW-U 132 (i.e., switch 132-U operating as an SGW-U), and PGW-U 138 (i.e., switch 138-U operating as an PGW-U), and AF 310 are particularly shown in the example of FIG. 5.

To begin, UE 105 may request a PDN connection (at 505, "UE requests a PDN connection"). The request for the PDN connection, and the establishment of the PDN connection may be implemented as a Non-Access Stratum (NAS) layer function. The request for the PDN connection may involve encoding a request, including the request, for transmission of the message over a radio interface. The encoding of the message may be performed, for example, by a baseband processor of UE 105.

Based on the request, control plane block 120 may establish a per-PDN connection (tunnel) in the user plane (at 510, "Control Plane Block establishes per-PDN connection tunnel"). As previously mentioned, the tunnel may include, for example, a GTP tunnel that is established between eNB 112 and the ingress to the PDN. Control plane block 120 may select any number of U-plane nodes (e.g., switches) to form the tunnel, and may appropriately configure the U-plane nodes to perform the needed roles. Thus, for example, switch 132 may be configured to act as an SGW-U and switch 138 may be configured to act as a PGW-U. Alternatively or additionally, other nodes may be configured to act only as routing/switching nodes for the tunnel. As previously mentioned, an SGW-U may handle buffering for the UE when the UE is in Idle mode (i.e., traffic received for the UE and from the PDN, when the UE is in Idle mode, may be stored (buffered) by the SGW-U node until the UE is no longer in Idle mode). The PGW-U of a node may be used for switches that are at the ingress/egress point in the PDN.

At some point, AF 310 may make a request for resources (at 515, "Request resources") to control plane block 120. In one implementation, the request may be for "bearer resources" and made pursuant to the existing Rx functionality specified in 3GPP TS 29.214. The request may be for one or more traffic flows. The traffic flows may be classified into one or more service data flows (SDFs), where each SDF may be associated with particular QoS information. A service data flow template (SDF template) may be provided for each SDF. The SDF template may serve as a template to which packets may be matched to determine the corresponding SDF.

Cloud plane block 120 may forward the request to eNB 112 (at 520, "Request resources (SDF, QoS)"). In one implementation, the forwarding of the request may include indicating the SDF corresponding to the traffic flow and indicating the particular QoS information. For example, the QoS parameters may include at least the QCI, and potentially also GBR, MBR, and ARP values. The QoS information may be signaled on a per-SDF basis.

The request for resources may also be signaled to UE 105 (at 525a or 525b). In one implementation the request for resources may be signaled from control plane block 120 to UE 105 (at 525a, "Request resources (SDF, QoS)"). The request may correspond to NAS signaling. Alternatively, the request for resources may also be signaled to UE 105 from eNB 112 (at 525b, "Request resources (SDF, QoS)"). The request may correspond to AS signaling. In either situation, the request may include the indication of the SDF and the QoS information. The UE may decode the resource request in order to process the resource request.

At this point, UE 105 and eNB 112 may schedule packets, as identified by the SDF, for transmission according to the associated QoS information (at 530, "Per-flow QoS handling). For instance, at UE 105, the UE may rely exclusively on the per-SDF QoS information to perform scheduling of uplink packets. As mentioned, all GBR traffic and all non-GBR traffic in UM RLC mode can be multiplexed on the same bearer. Thus, on the UE side, radio bearer priority may not be necessary when scheduling traffic (i.e., there may be no notion of radio bearer priority at the UE).

eNB 112 may request establishment of a new radio bearer between UE 105 and eNB 112 (at 535, "New RB establishment request"). The new radio bearer may be used to support non-GBR traffic (identified with a service data template) in AM RLC mode. The request to establish the new radio bearer may be indicated with a Radio Bearer number (RB #). The request to establish the new radio bearer may be a local decision at the eNB.

As previously mentioned, when UE 105 establishes a second PDN connection, the packets from the second PDN connection may be multiplexed with packets from the first PDN connection on the same radio bearer. UE 105 and eNB 112 may rely on the destination and source IP address/prefix, respectively, to discriminate the underlying PDN connections.

Figure 6:
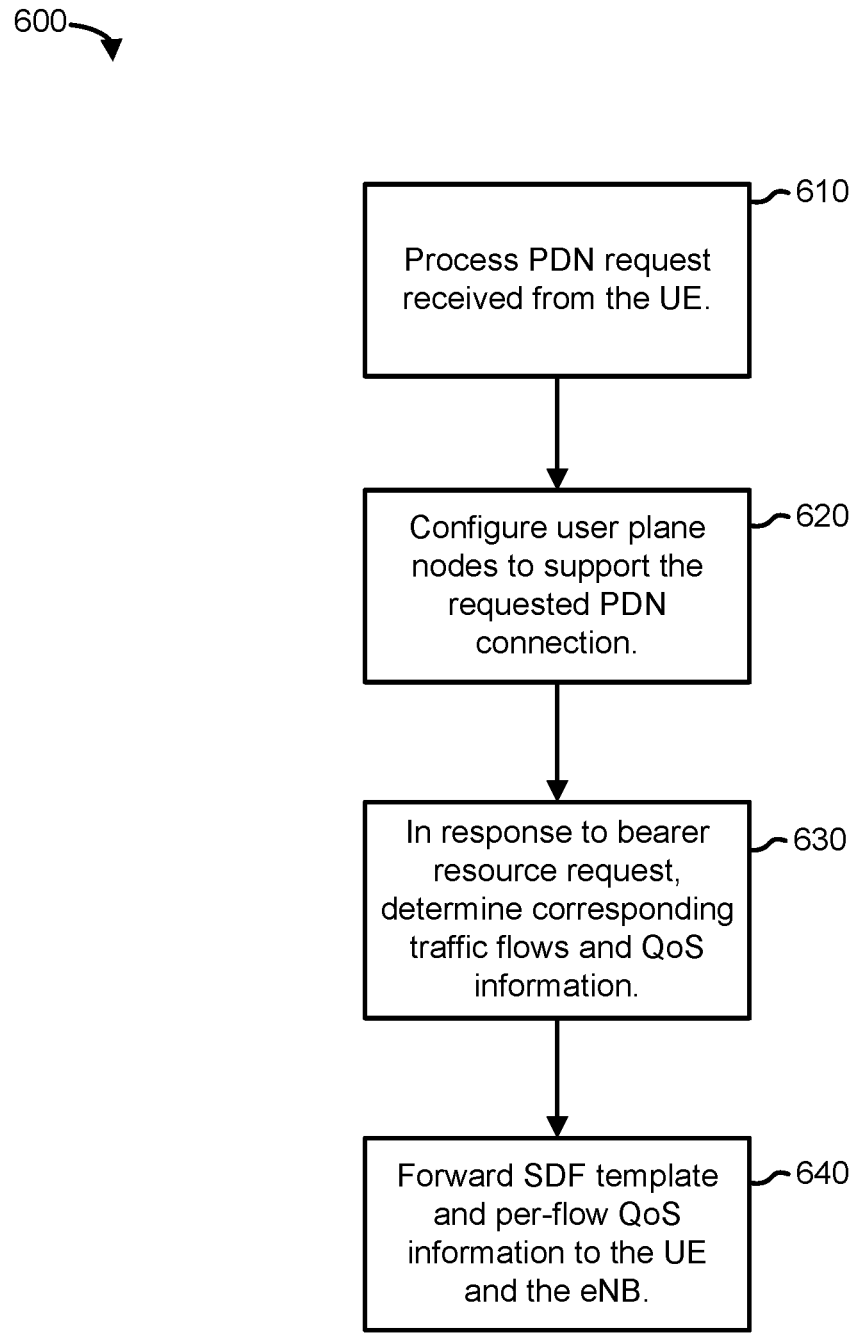
FIGS. 6 and 7 are flowchart illustrating example processes relating to the processing of traffic flows consistent with aspects described herein.

FIG. 6 is a flowchart illustrating an example process 600 relating to the processing of traffic flows consistent with aspects described herein. Process 600 may be performed by, for example, control plane block 120.

Process 600 may include processing a PDN request received from a UE (block 610). For example, a PDN request may be received from the UE and may indicate a particular PDN (e.g., PDN 150 or IMS 160) with which the UE is to establish a connection.

Process 600 may further include configuring user plane nodes (e.g., switches 132-140) to support the requested PDN connection (block 620). In one implementation, control plane block 120 may determine which of the user plane nodes are to act as SGW-U nodes and which of the user plane nodes are to act as PGW-U nodes. Other user plane nodes may be configured as routing/switching nodes. Based on the determined roles of each of the user plane nodes, control plane block 120 may appropriately configure the nodes. The PDN connection may be implemented using, for each UE and for each PDN, a single GTP connection between the eNB and the PGW-U.

As previously mentioned, SGW-U nodes may be switches that are configured to also perform buffering functions for the UEs, such as buffering functions relating to the buffering of packets received for Idle mode UEs.

Process 600 may further include, in response to a bearer resource request, determining corresponding traffic flows and QoS information (block 630). The bearer resource request may be, for example, a resource request received from AF 310. Based on the request, control plane block 120 may identify one or more corresponding traffic flows needed for the service request, and corresponding QoS information for each of the traffic flows. The traffic flows may be classified as corresponding to particular SDFs.

An indication of the identified SDF (i.e., the SDF template), and the corresponding QoS information, may be forwarded to the UE and the eNB (block 640). The UE and the eNB may subsequently use the QoS information to appropriately schedule packets for multiple traffic flows over a single radio bearer. The eNB may also use the SDF template to identify the SDF of received packets. The eNB may forward the received packets via an appropriate PDN connection, such as a GTP tunnel, towards the PGW-U of each traffic flow.

Figure 7:
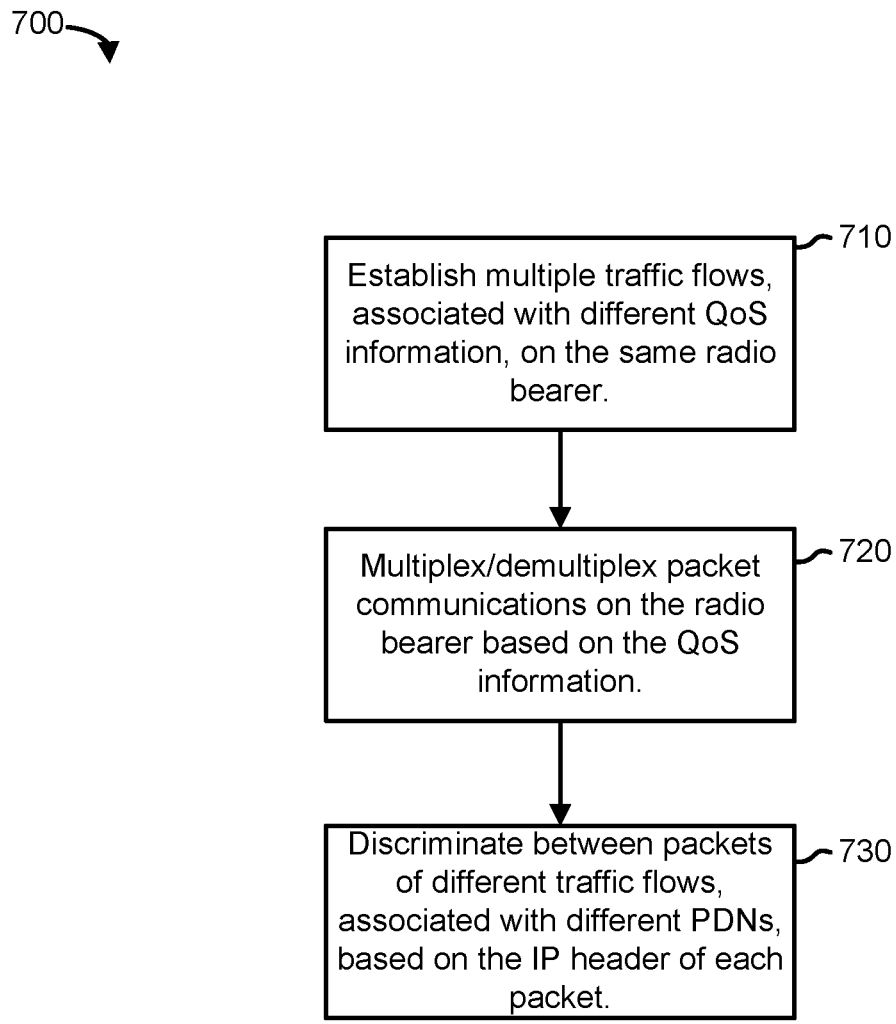

FIG. 7 is a flowchart illustrating another example process 700 relating to the processing of traffic flows consistent with aspects described herein. Process 700 may be performed by, for example, UE 105 and/or eNB 112.

Process 700 may include establishing multiple traffic flows, associated with different QoS information, on the same radio bearer (block 710). As mentioned previously, in one implementation, all GBR traffic and all non-GBR UM RLC traffic may be communicated on the same radio bearer.

Process 700 may further include multiplexing/demultiplexing the packet communications on the radio bearer based on the QoS information (block 720). For instance, UE 105 and eNB 112 may arbitrate the scheduling of packets for the radio bearer based on the QoS information. Thus, for example, packets from a traffic flow with a lower QCI value (higher priority) may be given higher priority over packets from a traffic flow with a relatively higher QCI value (lower priority) by the UE or eNB.

Process 700 may further include discriminating between packets of different traffic flows, associated with different PDNs, based on the IP header of each packet (block 730). For example, eNB 112 may examine the IP header of each received packet to determine the correct eNB-PDN tunnel for the packet. In this manner, multiple traffic flows associated with a radio bearer may be forked at the eNB and associated with different PDN tunnels (i.e., to different PGW-U nodes).

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
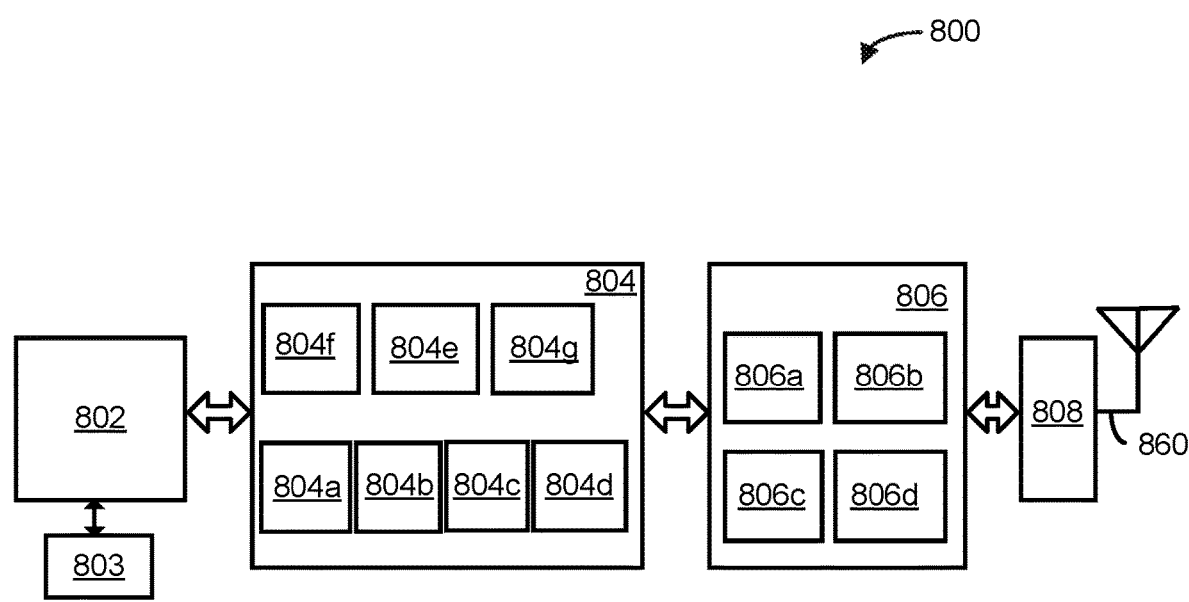
FIG. 8 is a block diagram illustrates example components of an electronic device.

Embodiments described herein may be implemented into a system using any suitably configured hardware and/or software. FIG. 8 illustrates, for one embodiment, example components of an electronic device 800. In embodiments, the electronic device 800 may be a mobile device, a RAN node, a network controller, a subscription repository, a data gateway, a service gateway, or an application server. In some embodiments, the electronic device 800 may include application circuitry 802, baseband circuitry 804, Radio Frequency (RF) circuitry 806, front-end module (FEM) circuitry 808 and one or more antennas 860, coupled together at least as shown. In embodiments in which a radio interface is not needed for electronic device 800 (e.g., a data gateway, network controller, etc.), the RF circuitry 806, FEM circuitry

808, and antennas 860 may be omitted. In other embodiments, any of said circuitries can be included in different devices.

Application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 803, which may be a non-transitory computer-readable medium. Application circuitry 802 may, in some embodiments, connect to or include one or more sensors, such as environmental sensors, cameras, etc.

Baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 8G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some implementations, the functionality of baseband circuitry 904 may be wholly or partially implemented by memory/storage devices configured to execute instructions stored in the memory/storage. The memory/storage may include, for example, a non-transitory computer-readable medium 804h.

In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 104f may be include elements for compression/decompression and echo cancellation and may include other suitable processing elements in other embodiments.

Baseband circuitry 804 may further include memory/storage 804g. The memory/storage 804g may be used to load and store data and/or instructions for operations performed by the processors of the baseband circuitry 804. Memory/storage 804g may particularly include a non-transitory memory. Memory/storage for one embodiment may include any combination of suitable volatile memory and/or non-volatile memory. The memory/storage 804g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 804g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals.

Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In various embodiments, when the electronic device 800 is implemented as part of a user equipment (UE), the baseband circuitry 804 may be configured to determine based on communication with an evolved node B (eNB), a higher layer configuration of physical downlink control channel (PDSCH) resources with shortened time transmission interval (TTI), where in the PDSCH resources are subset of the ZP CSI-RS resources; and determine an indication of a PDSCH transmission with shortened TTI using the configured resources using the DCI. In such embodiments, RF circuitry 806 may provide for the communication with the eNB.

In other embodiments, when the electronic device 800 is implemented as part of a user equipment (UE), the radio frequency (RF) circuitry may be configured to receive an indication of a modulation and coding scheme (MCS) and a resource allocation from an eNB; and baseband circuitry 804 may be configured to calculate a number of available resources (NRE) within the resource allocation; and determine a TBS indication based on the MCS and the NRE within the resource allocation.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+6 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+6 synthesizer.

In some embodiments, frequency input may be provided by a voltage-controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 860, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 860.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 860).

In some embodiments, the electronic device 800 may include additional elements such as, for example, memory/storage, display, camera, sensors, and/or input/output (I/O) interface. In some embodiments, the electronic device of FIG. 8 may be configured to perform one or more methods, processes, and/or techniques such as those described herein.

Figure 9:
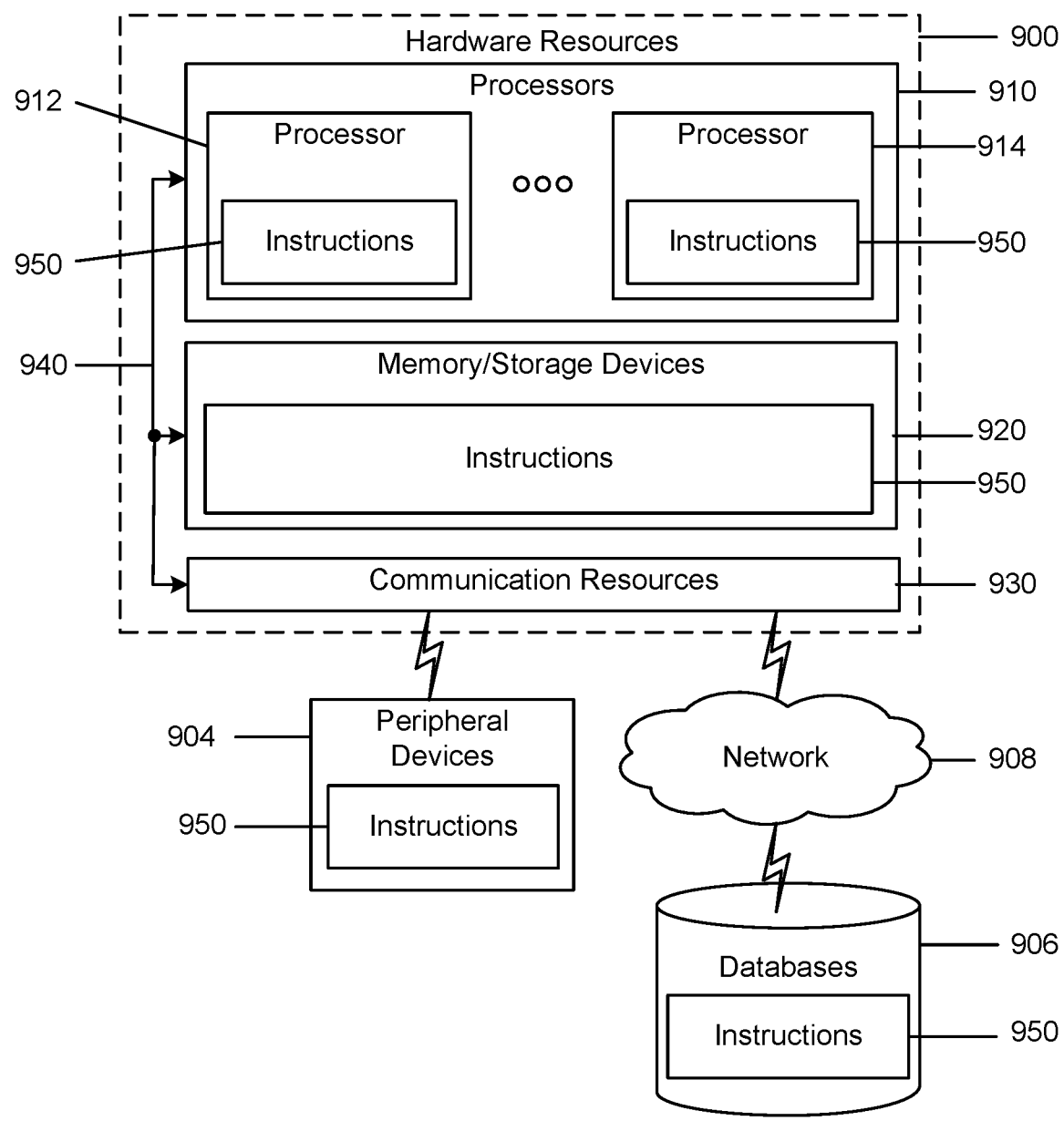
FIG. 9 is a block diagram example components of another electronic device.

FIG. 9 is a block diagram illustrating components, according to some example embodiments, able to read instructions from a machine-readable or computer-readable medium (e.g., a machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

A number of examples, relating to implementations of the techniques described above, will next be given.

In a first example, apparatus for a baseband processor of UE for a cellular communication network, may comprise circuitry to: generate a request to establish a connection with a PDN; process a resource request, associated with the PDN, to determine: an indication of a SDF associated with the resource request, and QoS information for packets in the SDF; and communicate with an eNB, via a particular radio bearer established between the UE and the eNB, the communication including: multiplexing transmission of packets corresponding to a plurality of different SDFs over the particular radio bearer, the multiplexing including scheduling the packets of the plurality of different SDFs based on the corresponding QoS information for each of the plurality of different SDFs.

In example 2, the subject matter of example 1, or any of the examples herein, wherein the indication of the SDF includes an SDF template.

In example 3, the subject matter of example 1, or any of the examples herein, wherein multiplexing the transmission of packets includes multiplexing GBR packets and non-GBR Unacknowledged Mode Radio Link Control (UM RLC) packets on the particular radio bearer.

In example 4, the subject matter of example 1, or any of the examples herein, wherein multiplexing the transmission of packets includes multiplexing transmission of packets for different PDNs on the particular radio bearer.

In example 5, the subject matter of examples 1-4, or any of examples herein, wherein the apparatus further comprises circuitry to: discriminate between packets associated with the different PDNs based on destination Internet Protocol (IP) addressing information of the packets.

In a sixth example, a computer-readable medium containing program instructions for causing one or more processors, associated with UE operable with a cellular communication network, to: transmit a request to establish a connection with a PDN; receive, from an eNB or from a control plane process associated with the cellular communication network, an indication of: a Service Data Flow (SDF), and QoS information for packets in the SDF; and communicate with the eNB, via a particular radio bearer established between the UE and the eNB, the communication including scheduling transmission of packets, corresponding to a plurality of different SDFs over the particular radio bearer.

In example 7, the subject matter of example 6, or any of the examples herein, wherein the scheduling includes scheduling the packets of the plurality of different SDFs based on the corresponding QoS information for each of the plurality of different SDFs.

In example 8, the subject matter of any of claim 6 or 7, or any of the examples herein, wherein the indication of the SDF includes an SDF template.

In example 9, the subject matter of any of examples 6 or 7, or any of the examples herein, wherein multiplexing the transmission of packets includes multiplexing Guaranteed Bit Rate (GBR) packets and non-GBR Unacknowledged Mode Radio Link Control (UM RLC) packets on the particular radio bearer.

In example 10, the subject matter of any of examples 6 or 7, or any of the examples herein, wherein scheduling the transmission of packets includes scheduling transmission of packets for different packet data networks on the particular radio bearer.

In example 11, the subject matter of example 10, or any of the examples herein, wherein the program instructions further include program instructions to cause the one or more processors to: discriminate between packets associated with the different packet data networks based on destination Internet Protocol (IP) addressing information of the packets.

In a 12$^{th}$ example, a computer-readable medium containing program instructions for causing one or more processors, associated with a control plane node for a cellular communication network, to: process a request, received from User Equipment (UE), to establish a connection with a packet data network (PDN); and configure user plane nodes, in the cellular communication network, to support the requested PDN connection, the configuring of the user plane nodes including establishing, for the UE, a single common Layer 2 connection between a serving Evolved NodeB (eNB) and the PDN.

In example 13, the subject matter of example 12, or any of the examples herein, wherein the common Layer 2 connection includes a General Packet Radio Service (GPRS) Tunneling Protocol (GTP) tunnel.

In example 14, the subject matter of example 12, or any of the examples herein, wherein the program instructions further include program instructions to cause the one or more processors to: configure at least one of the user plane nodes, in a path of the common Layer 2 connection, to buffer packets for the UE when the UE is in Idle mode.

In example 15, the subject matter of example 12, or any of the examples herein, wherein a plurality of the user plane nodes are configured to buffer packets, wherein each of the plurality of the user plane nodes that are configured buffer packets corresponds to a common Layer 2 connection for a PDN connection.

In example 16, the subject matter of example 12, or any of the examples herein, wherein the program instructions further include program instructions to cause the one or more processors to: determine an amount of the user plane nodes in the path of the common Layer 2 connection.

In example 17, the subject matter of examples 12, 14, 15, or 16, wherein the user plane nodes include configurable switches.

In example 18, the subject matter of any of examples 12-16, wherein the program instructions further include program instructions to cause the one or more processors to: provide Quality of Service (QoS) information to the eNB or UE on a per-Service Data Flow (SDF) basis.

In a 19$^{th}$ example, a control plane device for a cellular communication network may comprise: means for processing a request, received from User Equipment (UE), to establish a connection with a packet data network (PDN); and means for configuring user plane nodes, in the cellular communication network, to support the requested PDN connection, the configuring of the user plane nodes including establishing, for the UE, a single common Layer 2 connection between a serving Evolved NodeB (eNB) and the PDN.

In example 20, the subject matter of example 19, or any of the examples herein, wherein the common Layer 2 connection includes a General Packet Radio Service (GPRS) Tunneling Protocol (GTP) tunnel.

In example 21, the subject matter of example 19, or any of the examples herein, further comprising: means for configuring at least one of the user plane nodes, in a path of the common Layer 2 connection, to buffer packets for the UE when the UE is in Idle mode.

In example 22, the subject matter of claim 19, or any of the examples herein, wherein a plurality of the user plane nodes are configured to buffer packets, wherein each of the plurality of the user plane nodes that are configured buffer packets corresponds to a common Layer 2 connection for a PDN connection.

In example 23, the subject matter of example 19, or any of the examples herein, further comprising: means for determining an amount of the user plane nodes in the path of the common Layer 2 connection.

In a 24$^{th}$ example, a method, implemented by a control plane device in a cellular communications network, may comprise: processing a request, received from User Equipment (UE), to establish a connection with a packet data network (PDN); and configuring user plane nodes, in the cellular communication network, to support the requested PDN connection, the configuring of the user plane nodes including establishing, for the UE, a single common Layer 2 connection between a serving Evolved NodeB (eNB) and the PDN.

In example 25, the subject matter of example 24, or any of the examples herein, wherein the common Layer 2 connection includes a General Packet Radio Service (GPRS) Tunneling Protocol (GTP) tunnel.

In example 26, the subject matter of example 24, or any of the examples herein, further comprising: configuring at least one of the user plane nodes, in a path of the common Layer 2 connection, to buffer packets for the UE when the UE is in Idle mode.

In a 27$^{th}$ example, a method, implemented by User Equipment (UE) operable with a cellular communication network, may include transmitting a request to establish a connection with a packet data network (PDN); receiving from an evolved NodeB (eNB) or from a control plane process associated with the cellular communication network, an indication of: a Service Data Flow (SDF), and Quality of Service (QoS) information for packets in the SDF; and communicate with the eNB, via a particular radio bearer established between the UE and the eNB, the communication including scheduling transmission of packets, corresponding to a plurality of different SDFs over the particular radio bearer.

In example 28, the subject matter of example 27, or any of the examples herein, wherein the scheduling includes scheduling the packets of the plurality of different SDFs based on the corresponding QoS information for each of the plurality of different SDFs.

In example 29, the subject matter of any of examples 27 or 28, wherein the indication of the SDF includes an SDF template.

In example 30, the subject matter of any of examples 27 or 28, or any of the examples herein, wherein multiplexing the transmission of packets includes multiplexing Guaranteed Bit Rate (GBR) packets and non-GBR Unacknowledged Mode Radio Link Control (UM RLC) packets on the particular radio bearer.

In example 31, the subject matter of any of examples 27 or 28, or any of the examples herein, wherein scheduling the transmission of packets includes scheduling transmission of packets for different packet data networks on the particular radio bearer.

In example 32, the subject matter of example 31, or any of the examples herein, wherein the program instructions further include program instructions to cause the one or more processors to: discriminate between packets associated with the different packet data networks based on destination Internet Protocol (IP) addressing information of the packets.

In a 33$^{rd}$ example, a Use Equipment (UE) device, operable with a cellular communication network, may comprise: means for transmitting a request to establish a connection with a packet data network (PDN); means for processing, from an evolved NodeB (eNB) or from a control plane process associated with the cellular communication network, an indication of: a Service Data Flow (SDF), and Quality of Service (QoS) information for packets in the SDF; and means for communicating with the eNB, via a particular radio bearer established between the UE and the eNB, the communication including scheduling transmission of packets, corresponding to a plurality of different SDFs over the particular radio bearer.

In example 34, the subject matter of example 33, or any of the examples herein, wherein the scheduling includes scheduling the packets of the plurality of different SDFs based on the corresponding QoS information for each of the plurality of different SDFs.

In example 35, the subject matter of any of examples 33 or 34, or any of the examples herein, wherein the indication of the SDF includes an SDF template.

In example 36, the subject matter of examples 33 or 34, or any of the examples herein, wherein multiplexing the transmission of packets includes multiplexing Guaranteed Bit Rate (GBR) packets and non-GBR Unacknowledged Mode Radio Link Control (UM RLC) packets on the particular radio bearer.

In example 37, subject matter of any of examples 33 or 34, or any of the examples herein, wherein scheduling the transmission of packets includes scheduling transmission of packets for different packet data networks on the particular radio bearer.

In example 38, the subject matter of example 37, or any of the examples herein, wherein the program instructions further include program instructions to cause the one or more processors to: discriminate between packets associated with the different packet data networks based on destination Internet Protocol (IP) addressing information of the packets.

In example 39, the subject matter of claim 1, or any of the examples herein, wherein generating the request to establish the connection includes encoding a message, including the request, for transmission over a radio interface; and wherein processing the resource request includes decoding the resource request.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 5-7, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus comprising:
  processing circuitry configured to:
    generate a request to establish a connection with a packet data network (PDN);
    process a resource request, associated with the PDN, to determine:
      an indication of a Service Data Flow (SDF) associated with the resource request, and
      Quality of Service (QoS) information for packets in the SDF; and
  a transceiver configured to communicate with a Base Station (BS), via a particular radio bearer established between the UE and the BS, the communication including:
    multiplexing transmission of packets corresponding to a plurality of different SDFs over the particular radio bearer, the multiplexing including scheduling the packets of the plurality of different SDFs based on the corresponding QoS information for each of the plurality of different SDFs, wherein multiplexing the transmission of packets includes multiplexing Guaranteed Bit Rate (GBR) packets and non-GBR Unacknowledged Mode Radio Link Control (UM RLC) packets on the particular radio bearer.

2. The apparatus of claim 1, wherein the indication of the SDF includes an SDF template.

3. The apparatus of claim 1, wherein multiplexing the transmission of packets includes multiplexing transmission of packets for different PDNs on the particular radio bearer.

4. The apparatus of claim 3, wherein the apparatus further comprises circuitry to:
  discriminate between packets associated with the different PDNs based on destination Internet Protocol (IP) addressing information of the packets.

5. The apparatus of claim 1, wherein generating the request to establish the connection includes encoding a message, including the request, for transmission over a radio interface; and wherein processing the resource request includes decoding the resource request.

6. A non-transitory computer-readable medium storing program instructions that, when executed by one or more processors, cause the one or more processors to:
generate a request to establish a connection with a packet data network (PDN);
receive, from a Base Station (BS) or from a control plane process associated with the cellular communication network, an indication of:
a Service Data Flow (SDF), and
Quality of Service (QoS) information for packets in the SDF; and
communicate with the BS, via a particular radio bearer established between the UE and the BS, the communication including scheduling transmission of packets, corresponding to a plurality of different SDFs over the particular radio bearer, wherein a first SDF of the plurality of different SDFs is associated with Guaranteed Bit Rate (GBR) packets and a second SDF of the plurality of different SDFs is associated with non-GBR Unacknowledged Mode Radio Link Control (UM RLC) packets, wherein the GBR and the non-GBR UM RLC packets are multiplexed over the particular radio bearer.

7. The non-transitory computer-readable medium of claim 6, wherein the scheduling includes scheduling the packets of the plurality of different SDFs based on the corresponding QoS information for each of the plurality of different SDFs.

8. The non-transitory computer-readable medium of claim 6, wherein the indication of the SDF includes an SDF template.

9. The non-transitory computer-readable medium of claim 6, the communication comprising multiplexing the transmission of packets on the particular radio bearer, wherein multiplexing the transmission of packets includes multiplexing the GBR packets and the non-GBR UM RLC packets on the particular radio bearer.

10. The non-transitory computer-readable medium of claim 6, wherein scheduling the transmission of packets includes scheduling transmission of packets for different packet data networks on the particular radio bearer.

11. The non-transitory computer-readable medium of claim 10, wherein the program instructions further include program instructions to cause the one or more processors to:
discriminate between packets associated with the different packet data networks based on destination Internet Protocol (IP) addressing information of the packets.

12. A non-transitory computer-readable medium storing program instructions that, when executed by one or more processors, cause the one or more processors to:
process a request, received from User Equipment (UE), to establish a connection with a packet data network (PDN); and
configure user plane nodes, in the cellular communication network, to support the requested PDN connection, the configuring of the user plane nodes including establishing, for the UE, a single common Layer 2 connection between a serving Base Station (BS) and the PDN, wherein the single common Layer 2 connection between the BS and the PDN is configured to carry both Guaranteed Bit Rate (GBR) packets and non-GBR Unacknowledged Mode Radio Link Control (UM RLC) packets related to the UE, wherein the GBR and the non-GBR UM RLC packets are multiplexed over a particular radio bearer.

13. The non-transitory computer-readable medium of claim 12, wherein the common Layer 2 connection includes a General Packet Radio Service (GPRS) Tunneling Protocol (GTP) tunnel.

14. The non-transitory computer-readable medium of claim 12, wherein the program instructions further include program instructions to cause the one or more processors to:
configure at least one of the user plane nodes, in a path of the common Layer 2 connection, to buffer packets for the UE when the UE is in Idle mode.

15. The non-transitory computer-readable medium of claim 12, wherein a plurality of the user plane nodes are configured to buffer packets, wherein each of the plurality of the user plane nodes that are configured buffer packets corresponds to a common Layer 2 connection for a PDN connection.

16. The non-transitory computer-readable medium of claim 12, wherein the program instructions further include program instructions to cause the one or more processors to:
determine an amount of the user plane nodes in the path of the common Layer 2 connection.

17. The non-transitory computer-readable medium of claim 12, wherein the user plane nodes include configurable switches.

18. The non-transitory computer-readable medium of claim 12, wherein the program instructions further include program instructions to cause the one or more processors to:
provide Quality of Service (QoS) information to the BS or UE on a per-Service Data Flow (SDF) basis.

* * * * *